United States Patent [19]
Ranly et al.

[11] Patent Number: 5,373,766
[45] Date of Patent: Dec. 20, 1994

[54] SLITTER KNIFE HOLDER

[75] Inventors: Daniel P. Ranly, Minster; Rick L. Ahrns, New Bremen, both of Ohio

[73] Assignee: Monarch Machine Tool Co., Stamco Division, New Bremen, Ohio

[21] Appl. No.: 67,179

[22] Filed: May 24, 1993

Related U.S. Application Data

[63] Continuation of Ser. No. 879,963, May 6, 1992, abandoned.

[51] Int. Cl.$^5$ .......................... B23D 19/00; B26D 1/24
[52] U.S. Cl. ............................ 83/676; 83/497; 83/501; 83/698.41
[58] Field of Search ............ 83/495, 496, 497, 500, 83/501, 504, 508.2, 666, 676, 698.41

[56] References Cited

U.S. PATENT DOCUMENTS

| | | | |
|---|---|---|---|
| 3,143,024 | 8/1964 | Markowski | 83/504 X |
| 3,905,264 | 9/1975 | Eddy | 83/481 |
| 4,320,677 | 3/1982 | Tahara | 83/508.2 |
| 4,428,120 | 1/1984 | Kobayashi et al. | 30/390 |
| 4,485,714 | 12/1984 | Eriksson | 83/698 |
| 4,572,047 | 2/1986 | Punater et al. | 83/481 |
| 4,614,142 | 9/1986 | Fritz et al. | 83/496 |
| 4,784,030 | 11/1988 | Waring | 83/501 X |
| 4,922,778 | 5/1990 | Nagai | 83/501 |
| 4,934,238 | 6/1990 | Lauffer | 83/666 |

FOREIGN PATENT DOCUMENTS 2715055 10/1978 Germany .................. 83/504

*Primary Examiner*—Eugenia Jones
*Attorney, Agent, or Firm*—Thompson, Hine & Flory

[57] ABSTRACT

A holder for a circular cutting knife for slitting sheet metal, comprising a precision ground mounting shaft for attaching the cutting knife, the mounting shaft rotatably retained within a housing by engaging sets of high precision ball bearings. The ball bearings are located within the housing by a set of precision ground bearing spacers and precision ground bearing retainers. The bearings are preloaded in the housing to minimize longitudinal movement of the mounting shaft during operation. Additionally, the housing containing the bearings is tapered on one surface so that the cant of the knife blade can be adjusted by reversing the orientation of the housing.

5 Claims, 4 Drawing Sheets

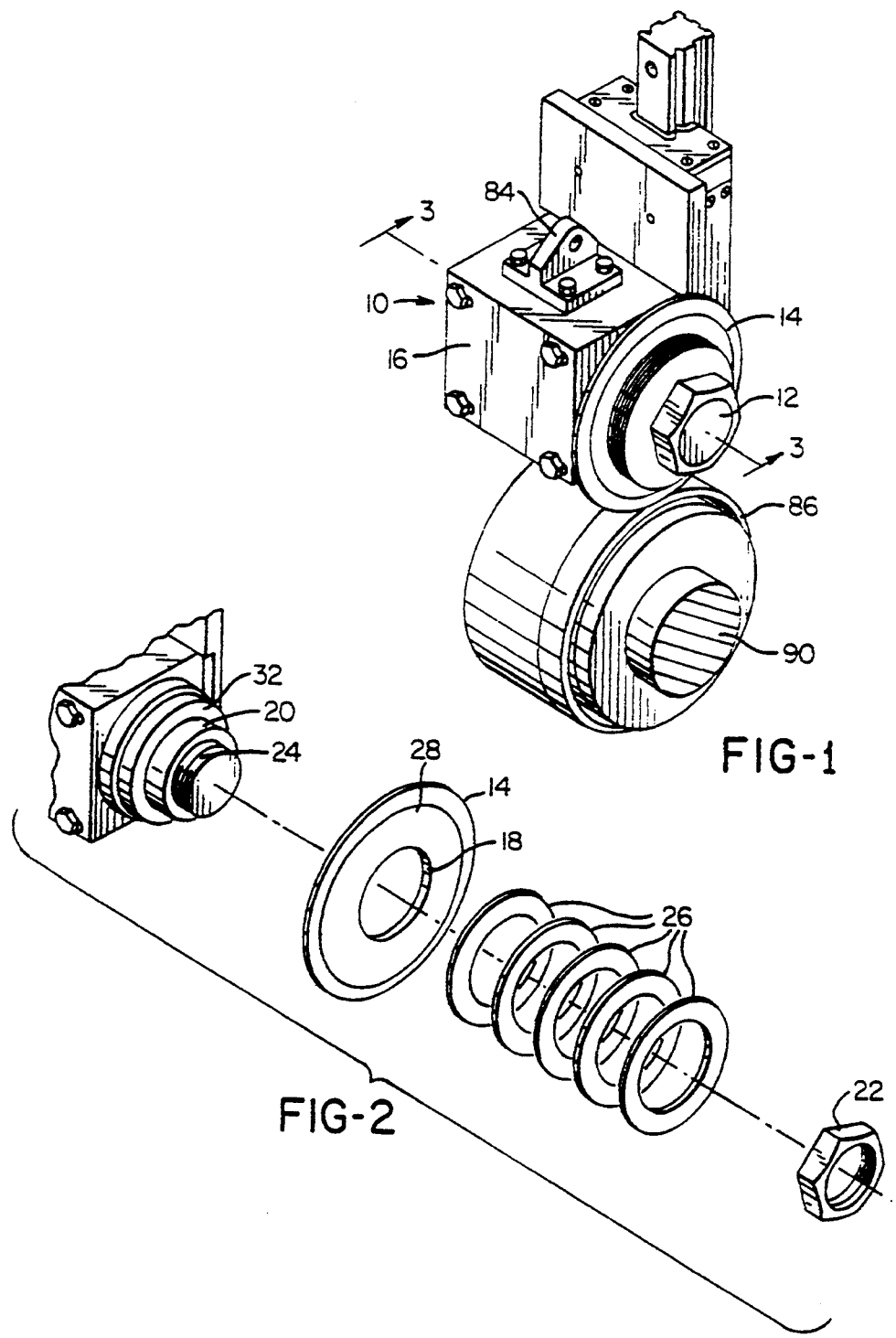

SLITTER KNIFE HOLDER

This is a continuation of co-pending application Ser. No. 07/879,963, filed May 26, 1993 now abandoned.

BACKGROUND OF THE INVENTION

This invention generally relates to a metal slitting apparatus and, more particularly, to a knife device for slitting sheet metal.

It is known that in sheet metal slitting, devices are used that have upper and lower cutting knives between which the metal is passed to accomplish the desired slitting or edging operation. Typically such devices use circular cutting knives rotatably mounted on shafts, one knife being fixed and the other being adjustable to accommodate varying metal thicknesses or tool placement.

In previous designs, the cutting knife is clamped to one end of the mounting shaft while the opposite end of the mounting shaft is rotatably mounted within a housing. A disadvantage of this design is that the imprecision of the cutting assembly connection causes cutting knife clearance changes in the cutting engagement, such that the knife does not maintain its setting and thus increases knife wear as well as producing inexact cut edges in the metal. Not only is this an undesirable result when the stock being cut requires a uniform and precise cut, but the operation is also more expensive because the service life of the cutting knives is shortened.

An attempt has been made to alleviate premature knife wear and the resulting imprecise slitting or edging by placing the cutting knife at an angle opposite the direction of the feed of the sheet metal, with the idea that the rotation plane of the inclined cutting knife will diverge from the direction of the cut edge of the sheet metal by the amount that the cutting knife is angled. This has been accomplished by placing the mounting shaft of one of the cutting knives at an angle with the sheet metal. This technique has provided some favorable results; however, the problems previously mentioned still exist.

In addition, premature knife wear and inexact cut edges result from the play occurring in the connection between the mounting shaft and the housing, specifically with the location of the shaft bearings within the housing. This play existing between the mounting shaft and the bearings causes the cutting knife to slightly wobble, causing the cutting knife to make contact with the lower knife, thereby causing excessive wear on the knife as well as producing an inexact cut. Therefore, a need exists for an improved knife holder design that eliminates the problems associated with previous cutting knife assemblies, and produces exact cuts as well as extending the service life for the cutting tool.

SUMMARY OF THE INVENTION

The present invention is a cutting knife holder assembly designed for slitting metallic sheet material which substantially reduces the inaccuracies occurring with prior art devices, thereby producing a better product and increasing the service life of the knife. The knife holder has been designed so that the components of the holder can be manufactured with precision tolerances. The invention comprises a circular cutting blade which is mounted on an arbor or mounting shaft by precision-ground components which remove unwanted deviations in the orientation and rotation of the knife blade.

The mounting shaft includes a precision ground body extending axially from the cutting knife. The shaft body is rotatably retained within a housing and engaged by sets of high precision angular contact ball bearings located within the housing. The ball bearings are located within the housing by a set of precision ground spacers and ground retainers which eliminate longitudinal movement of the mounting shaft during operation. The mounting shaft is retained within the housing by a bolt which is threaded through the bearing retainer into the end of the shaft body. All precision components are designed such that their surfaces can be ground on a cylindrical or surface grinder to achieve the desired tolerances.

Additionally, the bearings are preloaded in the housing which also contributes to the elimination of longitudinal movement of the arbor shaft. Finally, the housing containing the bearings is tapered on one surface so that the cant of the knife blade can be adjusted simply by reversing the orientation of the bearing housing. By utilizing highly precisioned bearings, retainers and spacers, as well as preloading the bearings, the play associated with prior art knife holders has been virtually eliminated thereby resulting in precision cuts and extended knife service life.

Accordingly, it is an object of the present invention to provide a knife holder design for a sheet metal slitting line which increases the quality of the strip produced; a knife holder design which allows easy and rapid adjustment and knife replacement; a knife holder design which can utilize closely-toleranced components to provide high-precision cutting; and a knife holder design which is of relatively simple construction.

These and other features and advantages of the present invention will be better understood by reference to the following detailed description, the accompanying drawings and the appended claims.

BRIEF DESCRIPTION OF THE DRAWING

FIG. 1 is a perspective view of a dished knife holder of the present invention;

FIG. 2 is a partial exploded view of the knife holder of FIG. 1;

Detailed Description

Figure 3:
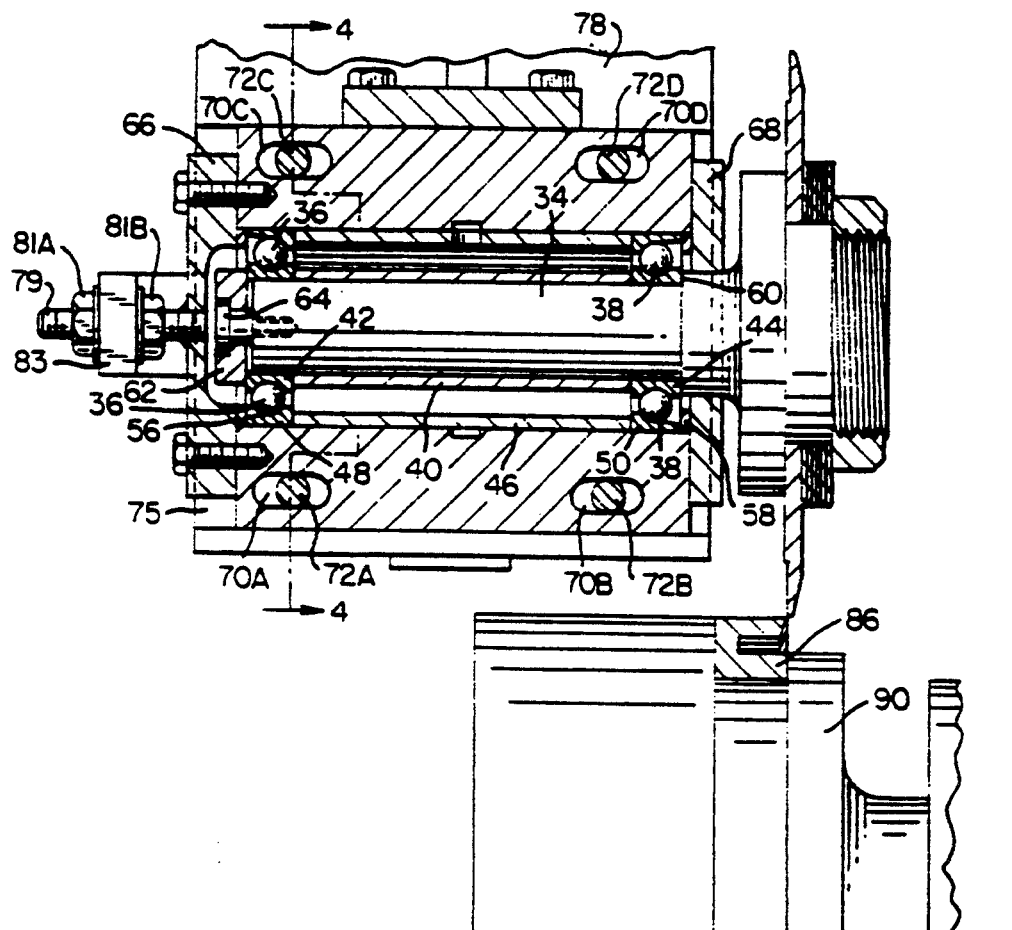
FIG. 3 is a horizontal cross sectional view taken along line 3—3 of the holder of FIG. 1.

A slitter knife holder, generally designated 10, of the present invention is shown in FIG. 1, and includes an arbor or mounting shaft 12 which supports a circular cutting knife 14. The mounting shaft is rotatably retained within a housing 16.

As can be seen in FIG. 2, the cutting knife 14 has a centrally located aperture 18 which is sized to fit closely with a collet 20 located on the mounting shaft. The cutting knife is secured to the mounting shaft by a nut 22 which is screwed onto a threaded end 24 of the mounting shaft. The nut 22 compresses against spring washers 26, typically bellville spring washers, adjacent a first face 28 of the cutting knife 14. The compression continues through the opposite or second face of the cutting knife against a precision ground flange 32 on the mounting shaft. This assembly firmly locks the cutting knife to the end of the mounting shaft. Precision ground components are utilized to assure a firm lock with a minimum of knife runout.

Referring to FIG. 3, the mounting shaft includes a precision ground shaft body 34 which extends axially from the flange. The shaft body is rotatably retained within the housing by engaging sets of super precision angular contact ball bearings 36, 38 located at opposite ends of the housing. The high precision ball bearings are the type that are commonly used in aircraft and allow the mounting shaft to be rotated.

Figure 4:
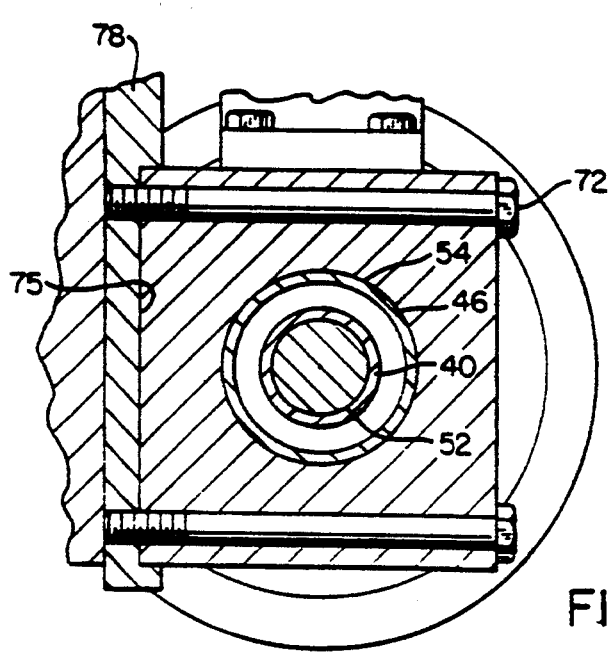
FIG. 4 is a vertical cross sectional view taken along line 4—4 of the holder of FIG. 3.

The ball bearings are precisely positioned within the housing by an inner cylindrical bearing spacer 40 having ends that are precision ground to engage the inner races 42 and 44 of the ball bearings, and an outer cylindrical bearing spacer 46 also having precision ground ends engaging the outer races 48 and 50 of the ball bearings. As shown in FIG. 4, the inner cylindrical bearing spacer 40 is adjacent the outer surface 52 of the shaft body while the outer cylindrical bearing spacer 46 is adjacent the inner surface 54 of the housing.

Again referring to FIG. 3, the ball bearings are also positioned within the housing by precision ground bearing spacers 56, 58, one located at either end of the housing adjacent the outer bearing races. Inner race 44 is positioned in the housing by abutting a shoulder 60 located on the mounting shaft. Inner race 42 is positioned in the housing by abutting bearing retainer 62. Bearing retainer 62 is similarly ground for clamping of the ball bearings. A cap screw 64 passes through bearing retainer 62 and is threaded into the end of the mounting shaft body to retain the bearing assembly on the mounting shaft.

To retain the bearing assembly within the housing, bearing retainers 66 and 68 are bolted over the ends of the housing. The housing and bearing retainers 66 and 68 are similarly ground to achieve a high tolerance assembly. The housing additionally has four slotted holes 70a, 70b, 70c, 70d so that the housing can be attached by bolts 72a, 72b, 72c, 72d, respectively, to a support plate 78. For precise positioning of the housing on the support plate, a threaded stud 79 is welded to bearing retainer 66 and retained by lock washers 81a, 81b to an L-shaped bracket 83 which is bolted to the support plate 78. Before bolts 70a, 70b, 70c, 70d are tightened down, threaded stud 79 can be adjusted to exactly locate the housing and knife assembly. The housing slides in a precision machined slot 75 in the support plate.

Figure 5:
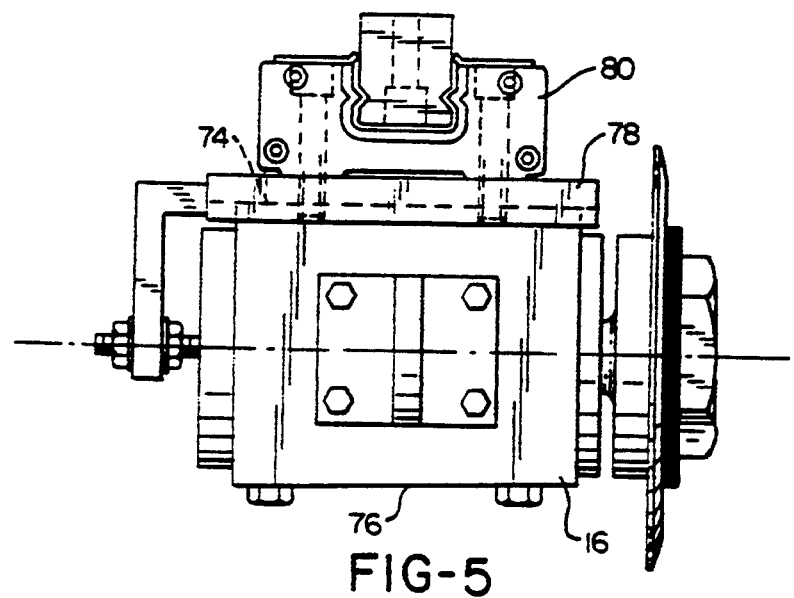
FIG. 5 is a top view of the knife holder of FIG. 1 wherein the holder is mounted on a non-tapered surface of its housing.
Figure 6:
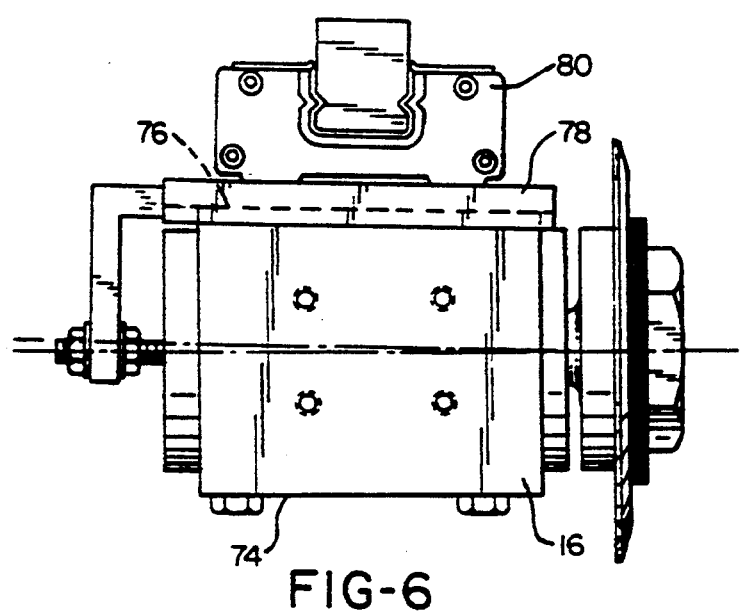
FIG. 6 is a top view of the holder of FIG. 1 wherein the holder is mounted along the tapered surface of the housing.

Referring now to FIGS. 5 and 6, the housing has been designed to include a straight surface 74 and a tapered surface 76. The tapered surface is a slight taper preferably 0.75° from the axis of the mounting shaft 12. The housing has incorporated different surfaces so that the orientation of the knife to the bottom knife can be changed. In FIG. 5, the housing has been mounted on the support plate 78 with its straight surface adjacent the support structure. In this configuration, the cutting knife is parallel to the metal to be cut. In FIG. 6 the housing has been mounted on the support structure with its tapered surface adjacent the supporting structure which provides a slight cant of the cutting knife in relation to the metal to be cut.

Figure 7:
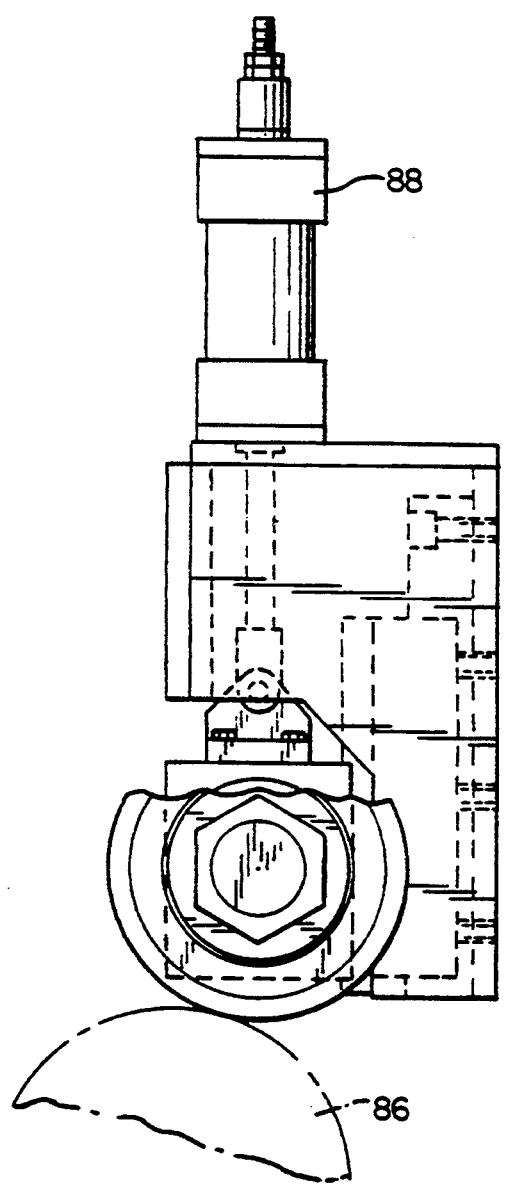
FIG. 7 is a side elevational view of the holder of FIG. 1 showing in phantom the holder attached to a supporting structure as well as showing in phantom a second cooperating cutting knife.

For depth adjustment of the cutting knife, the support plate 78 has been mounted on a precision slide 80. As shown in FIG. 7, the knife holder is raised and lowered by air cylinder 88. Depth of penetration is set by the double nut arrangement on the cylinder rod.

In operation, the metal to be cut passes between the cutting knife in the holder and a second cutting knife 86 which together perform the slitting operation. Referring back to FIGS. 1 and 3, cutting knife 86 is supported by its own mounting shaft 90.

The precision components of the knife holder are ground to create tolerances ranging from 0.0001 inch to 0.0002 inch. By utilizing high precision ball bearings and precision ground bearing spacers and bearing retainers, quality slit edges can be achieved because the mounting shaft cannot wobble within the housing. Not only are more precise cuts accomplished, but operating costs can be reduced through longer service life. Additionally, the ball bearings are preloaded in the housing to minimize longitudinal movement of the mounting shaft during operation.

A test run for the knife holder design of the present invention, based on running 0.012 inch thick aluminum at 4,000 feet per minute has resulted in an observed arbor end play of 0.0001 inch versus 0.01 inch for a prior art holder, knife shoulder runout of 0.00025 inch versus 0.0015 inch, and a torsional deflection of 0.023° versus 0.516° for the competitive holder. In this test run, service life of the knife was increased by a factor of almost 20, resulting in 3,125 miles of slit metal versus 160 miles for the prior art holder.

The preceding description has been presented with reference to a presently preferred embodiment to the invention shown in the drawings. Workers skilled in the art and technology to which this invention pertains will appreciate that alterations and changes in the described structure can be practiced without departing from the spirit, principles and scope of this invention.

What is claimed is:

1. A holder for a circular cutting knife adapted for slitting strip sheet metallic material, the cutting knife having a central aperture and opposing first and second faces, the holder comprising:

a precision ground mounting shaft for attaching the cutting knife, the mounting shaft having a threaded end, a collet adjacent to the threaded end sized to fit the aperture of the cutting knife, and a body extending axially from the collet;

means for securing the cutting knife to the threaded end;

a precision ground housing having means for rotatably retaining the mounting shaft body;

said retaining means including precision means located within the housing for engaging the mounting shaft body, said precision engaging means including a first set of ball bearings located at a first end of the housing and a second set of ball bearings located at a second end of the housing, and precision location means for positioning the ball bearings within the housing, the precision location means including, a precision ground cylindrical inner bearing positioner adjacent the mounting shaft body, a precision ground cylindrical outer bearing positioner adjacent to an inner surface of the housing, the inner bearing positioner and the outer bearing positioner being located between and contacting the first set of ball bearings and the second set of ball bearings, a first precision ground bearing retainer attached to the first end of the housing, a second precision ground bearing retainer attached to the second end of the housing, a first precision ground bearing spacer located at the first end of the housing between the first bearing retainer and the first set of ball bearings, and a second precision ground bearing spacer located at the second end of the housing between the second bearing retainer and the second set of ball bearings, whereby said mounting shaft, housing engaging means and location means are ground to predetermined dimensions within tolerances such that axial movement and runout of said knife is not greater than approximately 0.00025 inch, whereby precision and useful life of said knife are increased.

2. A holder assembly for a circular cutting knife for slitting sheet metal, the cutting knife having a central aperture and first and second opposing faces, the holder assembly comprising:

a precision ground mounting shaft shaped to receive the cutting knife;

the mounting shaft having a first threaded end, a collet adjacent the threaded end sized to fit closely with the aperture of the cutting knife, a flange adjacent to the collet, and a body extending axially from the flange;

a nut located on the threaded end of the mounting shaft;

a plurality of spring washers located on the collet adjacent the first face of the cutting knife;

a housing having an inner surface for rotatably retaining the mounting shaft body;

the housing containing a first set of ball bearings located at a first end of the housing and a second set of ball bearings located at a second end of the housing for engaging the mounting shaft;

a precision ground cylindrical inner bearing positioner adjacent the mounting shaft body;

a precision ground cylindrical outer bearing positioner adjacent the housing inner surface;

the inner bearing positioner and the outer bearing positioner being located between and contacting the first and second sets of ball bearings;

a precision ground first bearing retainer attached to the first end of the housing;

a precision ground second bearing retainer attached to the second end of the housing;

a first precision ground bearing spacer located at the first end of the housing between the first bearing retainer and the first set of ball bearings; and a second precision ground bearing spacer located at the second end of the housing between the second bearing retainer and the second set of ball bearings.

3. The holder assembly of claim 2 wherein the housing includes a tapered outer surface for adjusting the orientation of the cutting knife.

4. The holder assembly of claim 2 wherein the ball bearings are preloaded for minimizing longitudinal movement of the mounting shaft during operation of the cutting knife.

5. A holder for a circular cutting knife for slitting strip sheet material, the cutting knife having a central aperture and opposing first and second faces, the holder comprising:

a precision ground mounting shaft for attaching the cutting knife, the mounting shaft having a threaded end, a collet adjacent to the threaded end sized to fit the aperture of the cutting knife, and a body extending axially from the collet;

means for securing the cutting knife to the threaded end;

a precision ground housing having means for rotatably retaining the mounting shaft body;

said retaining means including precision means located within the housing for engaging the mounting shaft body;

said precision means is a first set of ball bearings located at a first end of the housing and a second set of ball bearings located at a second end of the housing; and precision location means for positioning the ball-bearings within the housing;

said precision location means comprising a precision ground cylindrical inner bearing positioner adjacent the mounting shaft body, a precision ground cylindrical outer bearing positioner adjacent an inner surface of the housing, the inner bearing positioner and the outer bearing positioner located between and contacting the first set of ball bearings and the second set of ball bearings, a first precision ground bearing retainer attached to the first end of the housing, a second precision ground bearing retainer attached to the second end of the housing, a first precision ground bearing spacer located at the first end of the housing between the first bearing retainer and the first set of ball bearings and, a second precision ground bearing spacer located at the second end of the housing between the second bearing retainer and the second set of ball bearings, whereby axial movement and runout of said shaft is minimized, such that precision and useful life of said knife are increased.

* * * * *